UNITED STATES PATENT OFFICE.

HENRY CLAY HAWES AND JAMES E. GREEN, 2D, OF BELLEVILLE, NEW YORK.

ROOFING COMPOUND.

SPECIFICATION forming part of Letters Patent No. 316,964, dated May 5, 1885.

Application filed October 30, 1884. (No specimens.)

*To all whom it may concern:*

Be it known that we, HENRY CLAY HAWES and JAMES E. GREEN, 2d, both of Belleville, in the county of Jefferson and State of New York, have invented a new and useful Improvement in a Roofing Compound; and we hereby declare the following to be a full and clear description thereof.

The object of our invention is to produce a roofing compound that will be economical in cost, easily applied, that will become hard almost immediately after its application and remain so regardless of climatic influences, and at the same time be both fire and water proof.

This roofing compound is an improvement on those roofing compositions which have coal-tar or a similar tar for a base; and it consists of the following-named materials, united in about the proportions and in the manner hereinafter described, and fabricated in the manner set forth in the subjoined formula. We take of coal-tar or the residuum tar from the manufacture of coal-gas, or an equivalent tar, about one barrel, and add to this about forty pounds of hydraulic cement or water-lime, about ten pounds of rosin, preferably white rosin, and about five pounds of a filling of red lead, and about forty pounds of ground iron ore, about ten pounds of gypsum, and from five to ten pounds of alum.

In preparing our improved roofing compound we proceed as follows: We boil the tar in a suitable vessel, and while maintaining it at a boiling-heat we add thereto all of the aforesaid ingredients in the order and in the proportions above recited, and in doing this we thoroughly stir the mass to properly incorporate the ingredients and produce a homogeneous mass.

The roofing compound thus prepared is applied to the roof or surface to be coated while the compound is yet hot. In this condition it is conveyed to the roof in a pail or other similar or suitable vessel, and is then spread out in one or more thin layers or coats by means of a brush or other suitable spreader. The coat of compound hardens sufficiently in about thirty minutes, and is then thoroughly firm, capable of withstanding any ordinary climatic temperature, very nearly fire-proof, and perfectly water-proof.

The properties of the several ingredients in this compound are well known. Combined and used substantially as hereinbefore described, they form a roofing compound of great density and firmness. The tar body makes the mass adhesive and elastic, the cement or water-lime sets and hardens the tar, the resin makes the compound adhesive, gives it a gloss, and makes it thoroughly water-proof. The red lead and iron ore which we use as a filling make the mass exceedingly dense and solid. The gypsum which we use as a filling makes the plastic mass conform to the surface to which it is applied, and, with the alum which we use, makes the whole soon harden, (with a glossy surface,) and renders it incombustible.

Our improvement in the above compound consists in the addition of the red lead and ground iron ore, which materials are absorbents, and the improved effects attained thereby are, first, they combine with the other ingredients chemically rather than mechanically, and thus form a homogeneous mass with the same; secondly, they solidify by oxidation and render the mass dense and solid, and, thirdly, they tend to render the compound more fire and water proof.

We prefer Portland cement to the usual Roman cement, because the former contains alkalies, which form a soluble silicate to act upon the lime in setting, and thus render the roofing more durable. We use white rosin, as it is best adapted to imparting elasticity and gloss to the compound, and to drying the same.

Having thus described our invention, what we claim as new, and desire to secure by Letters Patent, is—

The improved roofing compound, consisting in the admixture of red lead and ground iron ore with coal-tar, hydraulic cement, rosin, gypsum, and alum in about the proportions specified.

In witness whereof we have hereunto set our hands this 18th day of October, 1884.

HENRY CLAY HAWES.
JAMES E. GREEN, 2D.

In presence of—
JAMES M. CROW,
WILLIAM F. FELLOWS.